(12) United States Patent
Nasman

(10) Patent No.: US 12,722,233 B2
(45) Date of Patent: Sep. 1, 2026

(54) FABRICATION OF HIGH-STRENGTH AND LIGHTWEIGHT BEAMS AND STRUCTURES

(71) Applicant: TOKYO ELECTRON LIMITED, Tokyo (JP)

(72) Inventor: Ronald Nasman, Albany, NY (US)

(73) Assignee: TOKYO ELECTRON LIMITED, Tokyo (JP)

( * ) Notice: Subject to any disclaimer, the term of this patent is extended or adjusted under 35 U.S.C. 154(b) by 0 days.

(21) Appl. No.: 18/618,825

(22) Filed: Mar. 27, 2024

(65) Prior Publication Data

US 2025/0303501 A1 Oct. 2, 2025

(51) Int. Cl.

| | |
|---|---|
| ***B23K 20/00*** | (2006.01) |
| ***B23K 20/12*** | (2006.01) |
| ***B23K 31/02*** | (2006.01) |
| *B23K 101/28* | (2006.01) |
| *B23K 103/20* | (2006.01) |

(52) U.S. Cl.
CPC ........ *B23K 31/025* (2013.01); *B23K 20/1265* (2013.01); *B23K 20/128* (2013.01); *B23K 2101/28* (2018.08); *B23K 2103/20* (2018.08)

(58) Field of Classification Search
CPC .............. B23K 20/1265; B23K 20/126; B23K 20/1255; B23K 20/127; B23K 20/122; B23K 20/12
See application file for complete search history.

(56) References Cited

U.S. PATENT DOCUMENTS 2,486,284 A * 10/1949 Solomon ............ B65D 19/0038 108/57.1
2,934,372 A * 4/1960 Jewell .................. B62D 33/046 52/282.4
3,399,009 A * 8/1968 Slade ..................... A01K 97/08 206/315.11
3,419,952 A * 1/1969 Carlson ................... C22C 47/20 428/614
3,557,623 A * 1/1971 Shelter ...................... G01L 7/00 73/729.1
3,596,421 A * 8/1971 Miller ....................... E04B 5/40 52/333
3,620,880 A * 11/1971 Lemelson ............. B32B 15/043 428/614
3,686,081 A * 8/1972 Butter et al. ............. C25D 1/00 156/169
3,737,976 A * 6/1973 Lieberman ............. B23K 20/08 428/614
4,005,255 A * 1/1977 Wagner .................. B60M 1/302 428/602
4,220,419 A * 9/1980 Hawes ...................... F16B 7/00 403/189

(Continued)

OTHER PUBLICATIONS

Computer English Translation of JP2004314115A (Year: 2004).*

*Primary Examiner* — Erin B Saad
(74) *Attorney, Agent, or Firm* — Oblon, McClelland, Maier & Neustadt, L.L.P.

(57) ABSTRACT

A method for reinforcing structural members, including forming a beam of a first metal, the beam including one or more grooves along a surface of the beam; placing a rod of a second metal in each of the one or more grooves along the surface of the beam; and fusing each rod to the beam without melting the first metal.

7 Claims, 11 Drawing Sheets

(56) References Cited

U.S. PATENT DOCUMENTS 6,128,960 A * 10/2000 DiEdwardo ............ G01M 7/02 73/663
6,922,969 B1 8/2005 Mina
7,766,214 B2 * 8/2010 Park .................. B23K 20/1265 228/2.1
8,052,032 B2 * 11/2011 Park .................. B23K 20/1225 228/112.1
8,220,693 B2 * 7/2012 Krajewski .............. C23C 26/00 228/159
9,260,133 B2 2/2016 Hata et al.
9,987,707 B2 * 6/2018 Dong ..................... B22F 10/25
10,221,529 B1 * 3/2019 Sanders ................ H02G 3/386
12,383,975 B2 * 8/2025 Song .................... B23K 20/128
2003/0115810 A1 * 6/2003 Reinert, Sr. ............ E02D 5/805 52/156
2003/0192941 A1 * 10/2003 Ishida .................. B23K 20/128 228/2.1
2004/0049995 A1 * 3/2004 Rogers .................... E01C 9/086 52/177
2005/0035173 A1 * 2/2005 Steel .................. B23K 37/0531 228/2.1
2005/0077427 A1 * 4/2005 Brenner .................... B64C 1/12 244/117 R
2005/0116012 A1 * 6/2005 Packer ............... B23K 20/1225 228/112.1
2006/0166027 A1 * 7/2006 Amusin .................. C22C 47/06 428/614
2007/0181649 A1 * 8/2007 Park .................. B23K 20/1265 228/101
2007/0215675 A1 * 9/2007 Barnes ................. B23K 20/122 228/112.1
2008/0047222 A1 * 2/2008 Barnes .................. B23K 20/24 52/693
2010/0006622 A1 * 1/2010 Smith ................ B23K 20/1265 228/2.1
2010/0089977 A1 4/2010 Chen et al.
2010/0167083 A1 * 7/2010 Park .................. B23K 20/1265 228/2.1
2012/0167661 A1 * 7/2012 Welch ................ G01M 5/0025 73/8
2016/0221116 A1 * 8/2016 Kato .................... B23K 20/126
2017/0197274 A1 * 7/2017 Steel .................. B23K 20/1265
2019/0284773 A1 * 9/2019 Sanders ................... H02G 1/08
2020/0290150 A1 * 9/2020 Ahn ................. C23C 16/45572
2021/0339337 A1 * 11/2021 Takeoka ............... B23K 20/122

* cited by examiner

108

104
101 102 103
110a
201 202 203
110b
110
205 206 207
100

650

600

FABRICATION OF HIGH-STRENGTH AND LIGHTWEIGHT BEAMS AND STRUCTURES

TECHNICAL FIELD

The disclosure relates generally to methods of reinforcing structural members.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Structural members can be reinforced to increase strength and ductility for manufacturing, construction, etc. Reinforced members can be composites of two or more materials. The addition of materials for reinforcement can be expensive and increase the weight of the member as a whole.

SUMMARY

In one embodiment, the present disclosure relates to a method for reinforcing structural members, comprising: forming a beam of a first metal, the beam including one or more grooves along a surface of the beam; placing a rod of a second metal in each of the one or more grooves along the surface of the beam; and fusing each rod to the beam without melting the first metal.

In one embodiment, the present disclosure relates to a method for reinforcing structural members, comprising: forming a beam of a first metal, the beam including one or more grooves along a surface of the beam; placing a rod of a second metal in each of the one or more grooves along the surface of the beam; and embedding each rod in the beam using friction stir welding.

In one embodiment, the present disclosure relates to a method for reinforcing structural members, comprising: forming a beam of a first metal, the beam including one or more grooves along a surface of the beam; placing a rod of a second metal in each of the one or more grooves along the surface of the beam; providing a cap of the first metal over each rod in each of the one or more grooves along the surface of the beam; and embedding each rod in the beam by solid-state welding the beam, rod and cap together.

Note that this summary section does not specify every embodiment and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
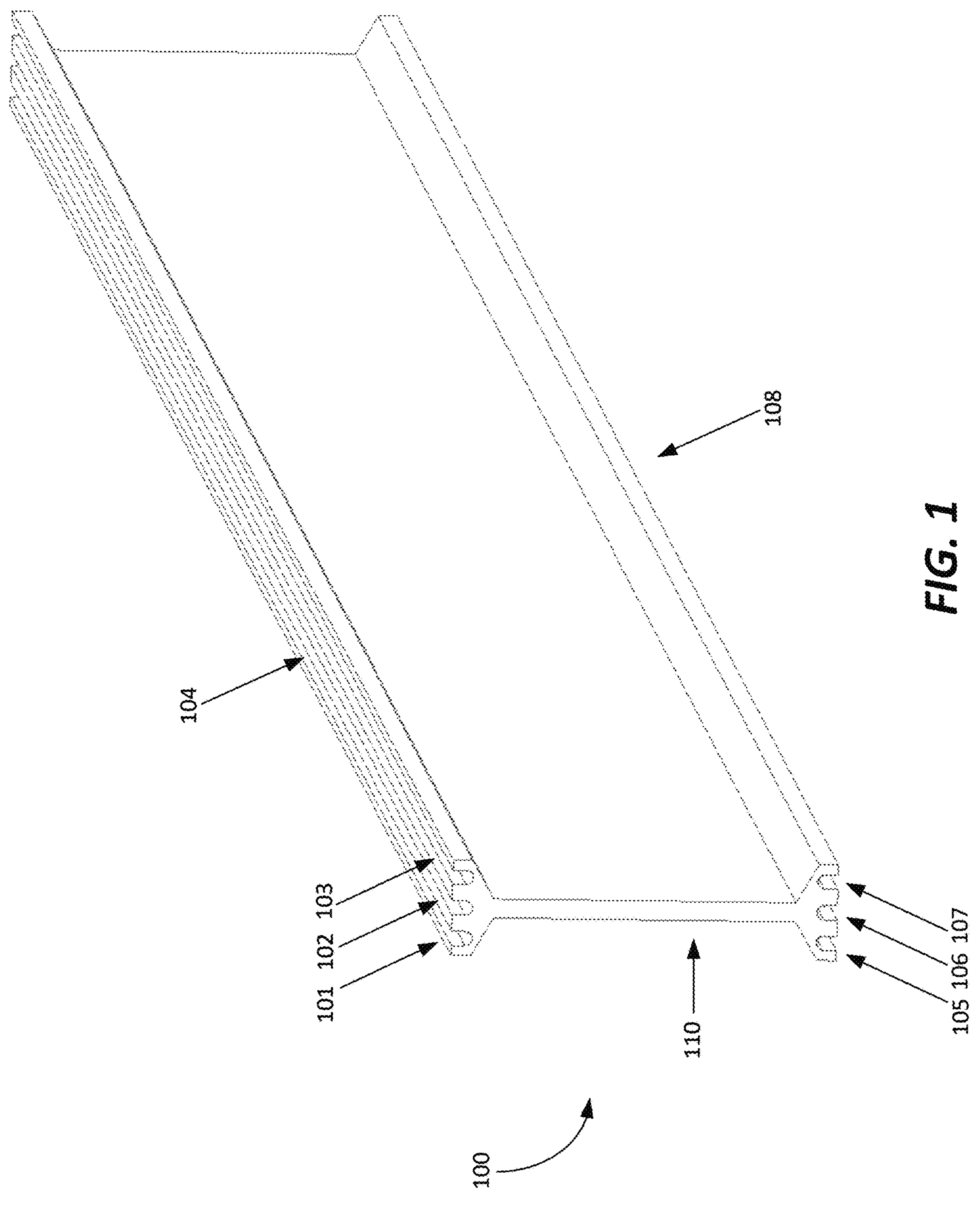
FIG. 1 is an illustration of a structural member, according to one embodiment of the present disclosure.

Referring now to the drawings, wherein like reference numerals designate identical or corresponding parts throughout the several views.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as “top,” “bottom,” “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The order of discussion of the different steps as described herein has been presented for clarity’s sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

In one embodiment, the present disclosure is directed towards systems and methods for reinforcing high-stress regions of structural members. The methods described herein can be used to increase the strength of members at critical locations through a combination of compositional and structural reinforcement. The reinforced structural members as described herein can weigh less than structures that are reinforced by conventional techniques. Reducing the weight of a reinforced structural member while maintaining or increasing the strength of the reinforced member can reduce the cost and labor needed to transport or install the structural member. For example, a lighter structural member can be directly lifted or transported without the use of heavy lifting machinery.

In one embodiment, the combination of compositional and structural reinforcement as presented herein can also reduce the cost of strengthening a structural member. For example, the methods as described herein can reduce the amount of a strengthening material that is needed to reinforce the structural member. The methods of the present disclosure also provide flexibility and repeatability in the manufacturing process and can be applied to various types of components. For example, the methods can be used to reinforce beam structures, lids and covers, containers (e.g., cylindrical containers), etc. The reinforced members can then be used in tools, machinery, infrastructure, etc.

A structural member can be reinforced by adding material to a high-stress area. For example, an I-beam can resist bending via the flange and shear forces via the web, which connects the flanges at a point of high compressive and tensile stress. A structural member can also be reinforced by adding a stronger material to high-stress areas. For example, reinforced concrete is a composite material and can include steel bars positioned inside the concrete to strengthen tensile or compressive faces.

In one embodiment, the present disclosure is directed to a method of reinforcing a structural member by embedding a component of a reinforcement material in a high-stress area of the structural member. The reinforcement component can then be fused to the structural member. The reinforcement material can be any material that can increase the strength of the structural member. In one embodiment, the structural member can be an aluminum component (base), and the reinforcement material can be steel. In one embodiment, the structural member can be an aluminum I-beam or similar structure having a flange, e.g., an H-beam. It can be appreciated that the I-beam is presented as a non-limiting example of a structure that can be reinforced, and that the methods described herein are compatible with various arrangements and geometries of structural members and reinforcement components. For example, the structural member can be a flat plate (e.g., lid, cover), chamber, tube, etc.

In one embodiment, the structural member can be manufactured such that a surface of the structural member includes one or more grooves, channels, or indentations. The one or more grooves can be positioned at a high-stress face of the structural member. For example, when the structural member is an I-beam, the one or more grooves can be positioned lengthwise along the face of the flanges of the I-beam. The grooves can extend along at least a portion of the length of the I-beam.

FIG. 1 is an illustration of an I-beam 100 having three grooves 101, 102, 103 along the upper flange 104 and three grooves 105, 106, 107 along the opposing flange 108. The flanges 104, 108 are connected by the web 110. The grooves can be approximately rounded or can be formed by any number of faces. For example, a groove can be a notched channel, a rectangular channel, etc. The structural member can be manufactured via a variety of processes, including, but not limited to, extrusion, casting, plate milling, etc.

In one embodiment, the grooves can be filled with components of a reinforcement material. The reinforcement material can have higher tensile strength and/or ductility than the material of the structural member. In one embodiment, the reinforcement material can be hardened steel. The hardened steel can be manufactured by heating carbon steel followed by quenching and tempering to form strong crystalline structures.

Figure 2:
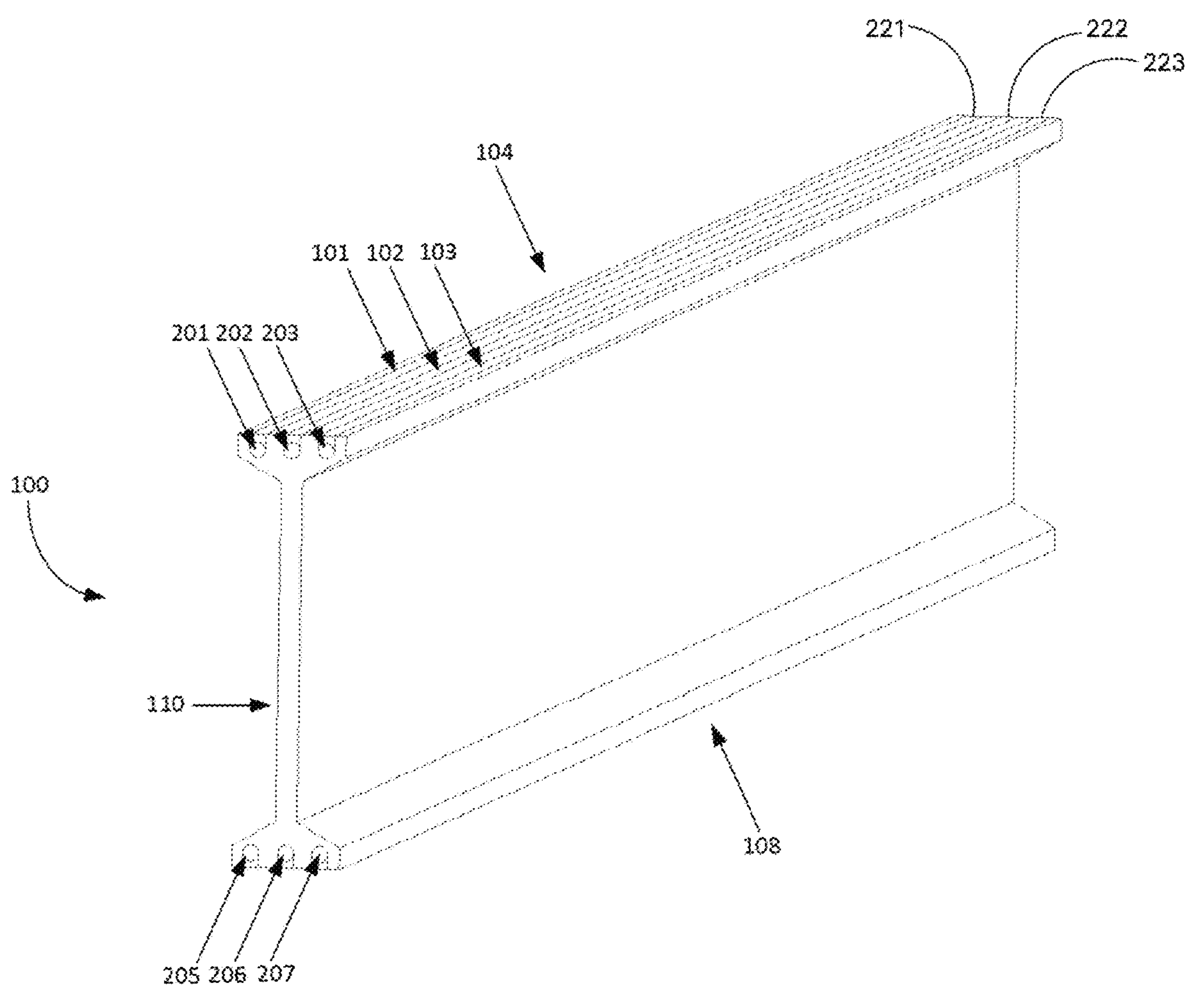
FIG. 2 is an illustration of a structural member and embedded reinforcement components, according to one embodiment of the present disclosure.

FIG. 2 is an illustration of the I-beam 100 having reinforcement components 201, 202, 203 in grooves 101, 102, 103, respectively, and reinforcement components 205, 206, 207, in grooves 105, 106, 107, respectively. In one embodiment, the reinforcement components can be hardened steel components. In one embodiment, the reinforcement components can be cylindrical or approximately cylindrical rods. In one embodiment, the reinforcement components can be machined approximately in the shape and dimensions of the grooves. In one embodiment, the reinforcement components can be fitted into the grooves so that the rods are not exposed at the flange face. In one embodiment, the reinforcement components can be approximately flush with the flange face when fitted into the grooves. In one embodiment, the reinforcement components can have a different shape and/or different dimensions from the grooves. For example, a reinforcement component 201 can be an elongated bar and can be fitted into a rounded cylindrical groove 101. The reinforcement component 201 does not need to form an exact fit with the surrounding groove 101.

In one embodiment, a reinforcement component can include structural features configured to interlock with the structural member. For example, a reinforcement component can include raised ribs along the exterior of the component. The ribs can provide surface area to mechanically interface with and secure the reinforcement component to the surrounding material of the structural member. Alternative or additional structural features can include, but are not limited to, bumps, ridges, edges, protrusions, projections, divots, etc. along one or more dimensions of the reinforcement component. In one embodiment, the surface of a groove can include structural features configured to interlock with the reinforcement component. The structural features of the groove can include, but are not limited to, ribs, bumps, ridges, edges, protrusions, projections, divots, etc. along one or more dimensions of the groove. In one embodiment, the structural features of the groove can correspond to structural features of the reinforcement component. For example, the structural features of the reinforcement component can interlock with or fit over, around, or within structural features of the groove.

In one embodiment, the reinforcement component can be covered with a cap. For example, as shown in FIG. 2, caps 221, 222, 223 cover the reinforcement component. The cap can be a bar or rod that can be placed over the reinforcement component in the groove. In one embodiment, the cap can fill at least a portion of the remaining volume in the groove when the cap is placed over the reinforcement component. In one embodiment, the cap can form a loose fit over the reinforcement component or the groove. In one embodiment, the cap can cover the groove at the surface of the flange. In one embodiment, the cap can be composed of the first material of the structural member. The cap can provide additional material that can be used to fuse the reinforcement component to the structural member without melting. In one embodiment, the cap can be omitted when the reinforcement component is melded to the groove.

The reinforcement components can be fused to the structural member (e.g., the I-beam 100) via a welding process. In one embodiment, the welding process can be a solid-state welding process wherein at least one of the first material (of the structural member) and the second material (of the reinforcement component) is not melted. Solid-state welding techniques can utilize mechanical (pressure, friction) or electromagnetic forces to plastically join two components (workpieces) without melting either workpiece (also referred to as "melding"). For example, friction welding (e.g., rotary friction welding, linear friction welding, friction stir welding, friction surfacing) generates heat via friction between two components to fuse the workpieces together. A friction stir tool for friction stir welding can include a wear-resistant cylindrical or conical tip (probe) configured to rotate. The friction stir tool can be positioned in contact with one or both of the workpieces (the structural member and the reinforcement component). The friction stir tool can then rotate and be traversed along a joining line (weld line) between the workpieces. The rotation of the friction stir tool in contact with the workpieces can generate frictional heat, and the frictional heat can soften the workpieces. The rotation of the friction stir tool can also mix the materials of the two workpieces. A force can be applied approximately perpendicular to the traversal of the friction stir tool in order to press the heated workpieces together and enable fusing of the workpieces. In one embodiment, the lateral force can be applied following the traverse of the friction stir tool.

Figure 3:
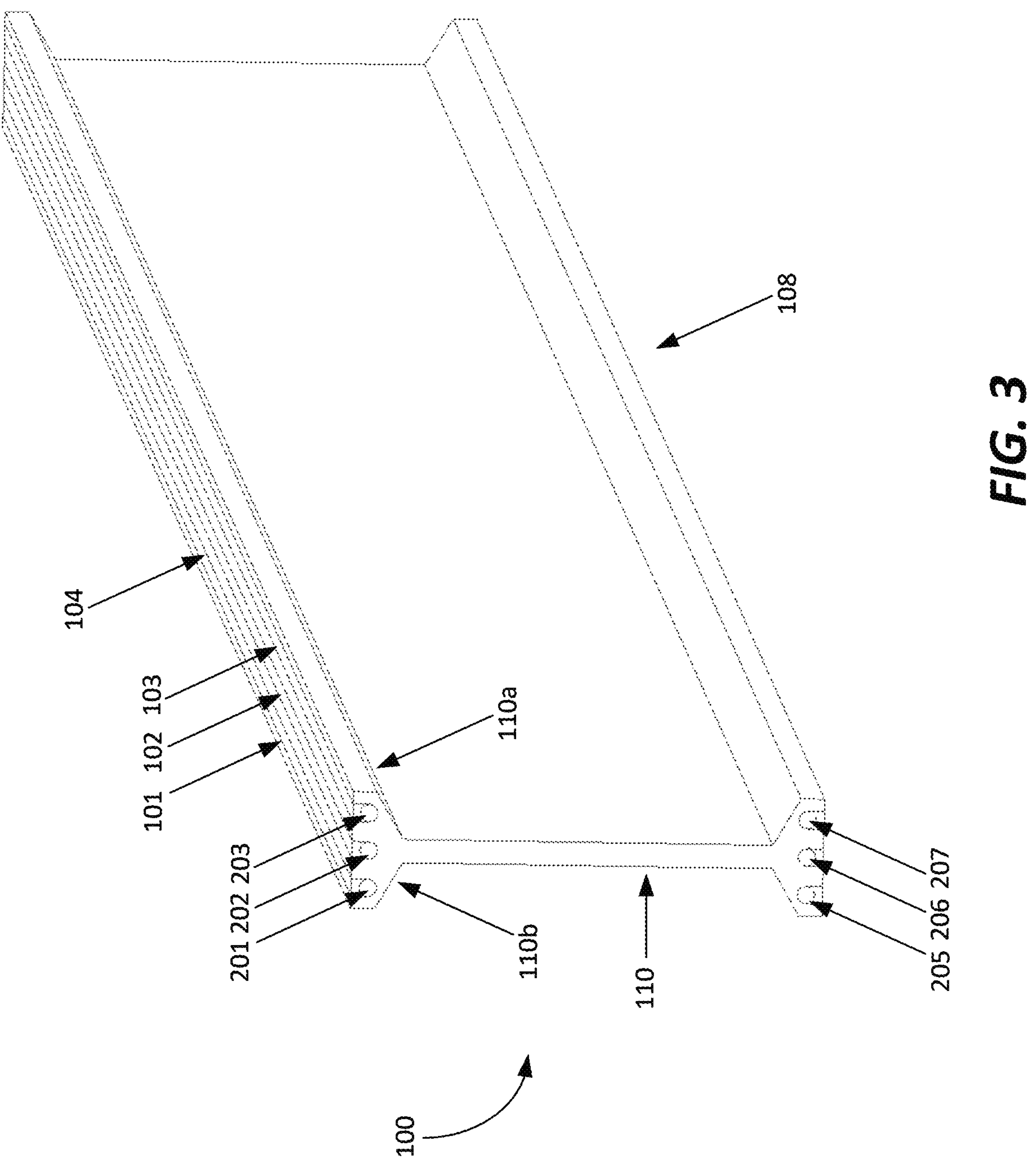
FIG. 3 is an illustration of a structural member and embedded reinforcement components, according to one embodiment of the present disclosure.

FIG. 3 is an illustration of an I-beam where welding (e.g., friction stir welding) can be used to fuse the reinforcement components 201, 202, 203 to the grooves 101, 102, 103. A rotating friction stir tool can be traversed along the length of each groove to weld the reinforcement component to the walls of the groove. In one embodiment, a friction stir tool can be used to weld the reinforcement components to the grooves at or near the face of the upper flange 104. In one embodiment, the welded material, which can be a combination of the first material of the I-beam and the second material of the reinforcement components, can form the face of the upper flange 104. In one embodiment, the reinforcement components can be welded to the grooves while a supporting force (pressure) is applied to overhanging surfaces 110*a*, 110*b* at the base of the flange. The base of the flange can be the sides of the flange in contact with the web 110. For example, the I-beam can be held in place during welding via contact with the base of the flange 110*a*, 110*b*. The support at the base of the flange 110*a*, 110*b* can provide the resistance or pressing force to facilitate fusing the reinforcement components to the grooves when the friction stir tool softens the components.

The welding can secure the reinforcement components to the structural member and can fill in any gaps between a reinforcement component and a surrounding groove. The reinforcement components can then be contained within the structural member. In one embodiment, the structural member can be permanently stressed during the welding process in order to strengthen the member as a whole. For example, the structural member can be prestressed by holding the reinforcement components in tension during the welding such that the surrounding structural member is compressed during the welding. As a result, the structural member can be further strengthened against compressive forces during use.

Figure 4:
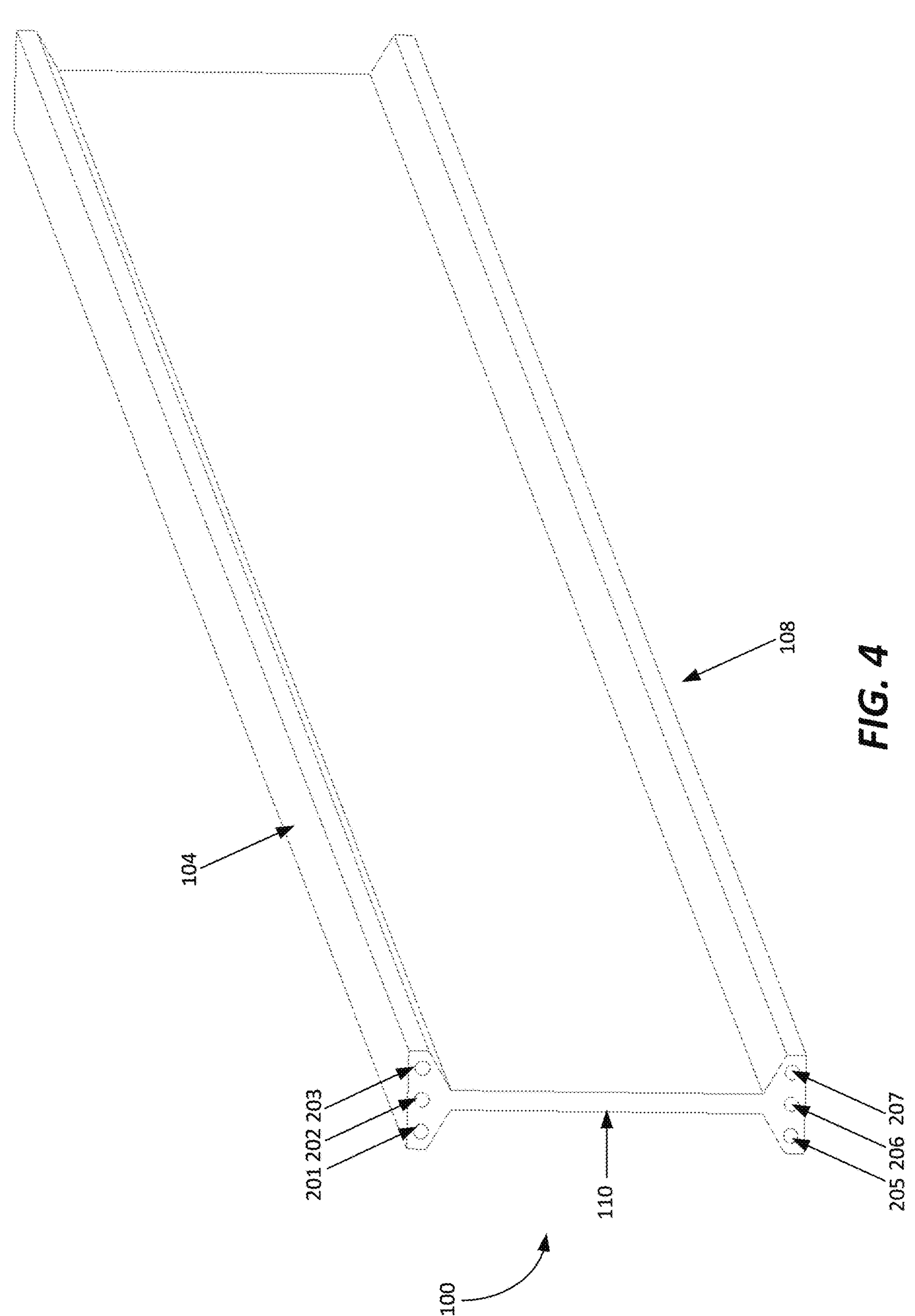
FIG. 4 is an illustration of a finished reinforced structural member, according to one embodiment of the present disclosure.

FIG. 4 is an illustration of a finished reinforced I-beam 100. In one embodiment, the fusion area (e.g., the face of each flange 104, 108) can be finished after the reinforcement components have been welded to the grooves. The grooves can be effectively filled by the reinforcement components and the welded material. The reinforcement components 201, 202, 203 and 204, 205, 206 can then be embedded in the upper flange 104 and the lower flange 108 of the I-beam 100. The reinforcement components strengthen the I-beam 100 by providing stronger material (e.g., steel) within the I-beam. The addition of the reinforcement components to certain regions (the flanges) of the I-beam can result in effective strengthening of high-stress regions without adding unnecessary weight to other regions of the I-beam that do not need to be reinforced. Furthermore, the friction stir welding process can embed the reinforcement components in the I-beam in a cost-efficient manner while avoiding issues associated with melting and cooling in non-solid-state welding processes. The use of grooves or similar channels for containing the reinforcement components is also well-suited for traversal of a friction stir tool. The grooves can easily be machined in a structural member such as an I-beam, e.g., during extrusion of the I-beam.

Figure 5A:
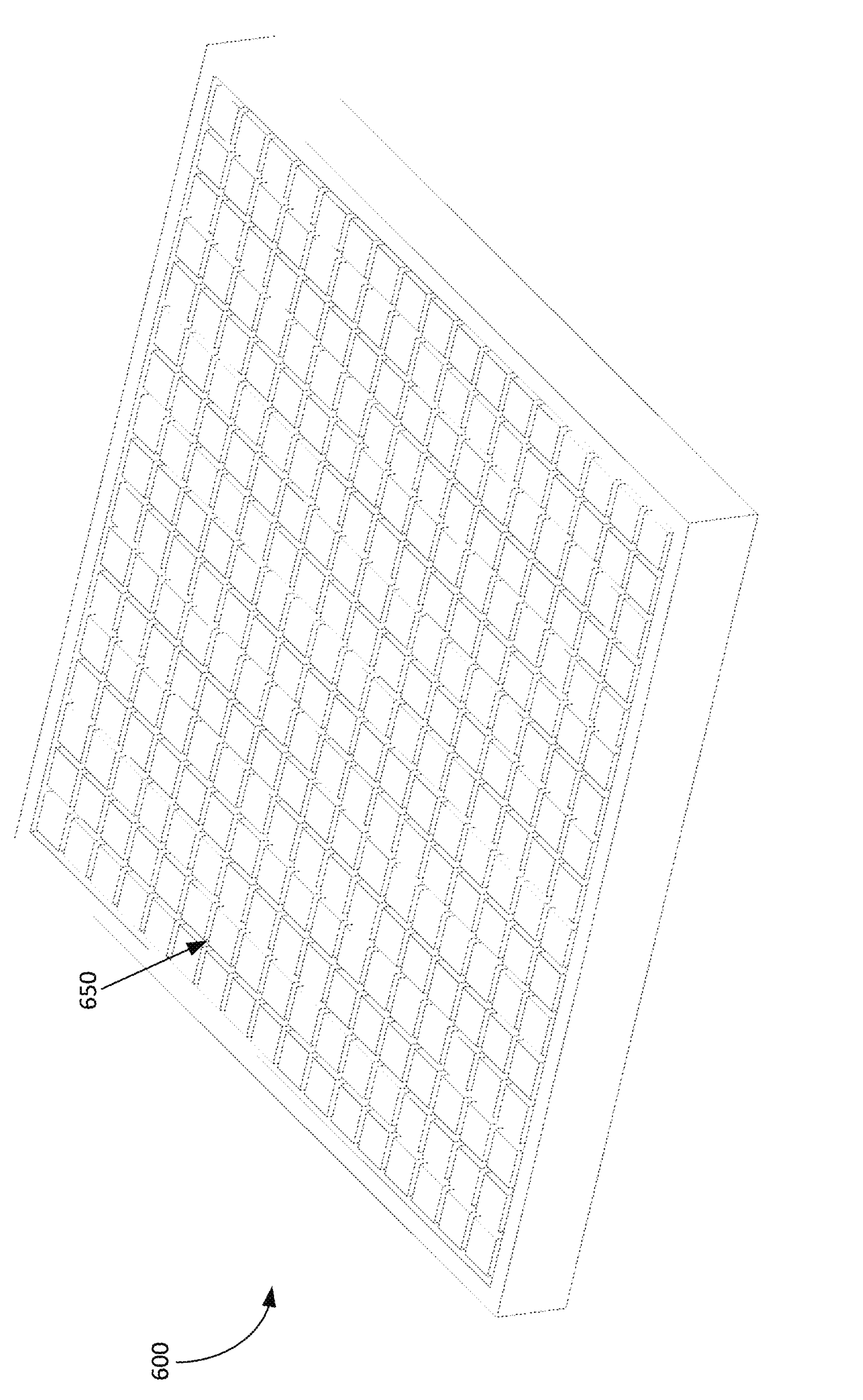
FIG. 5A is an illustration of a structural member, according to one embodiment of the present disclosure.
Figure 5B:
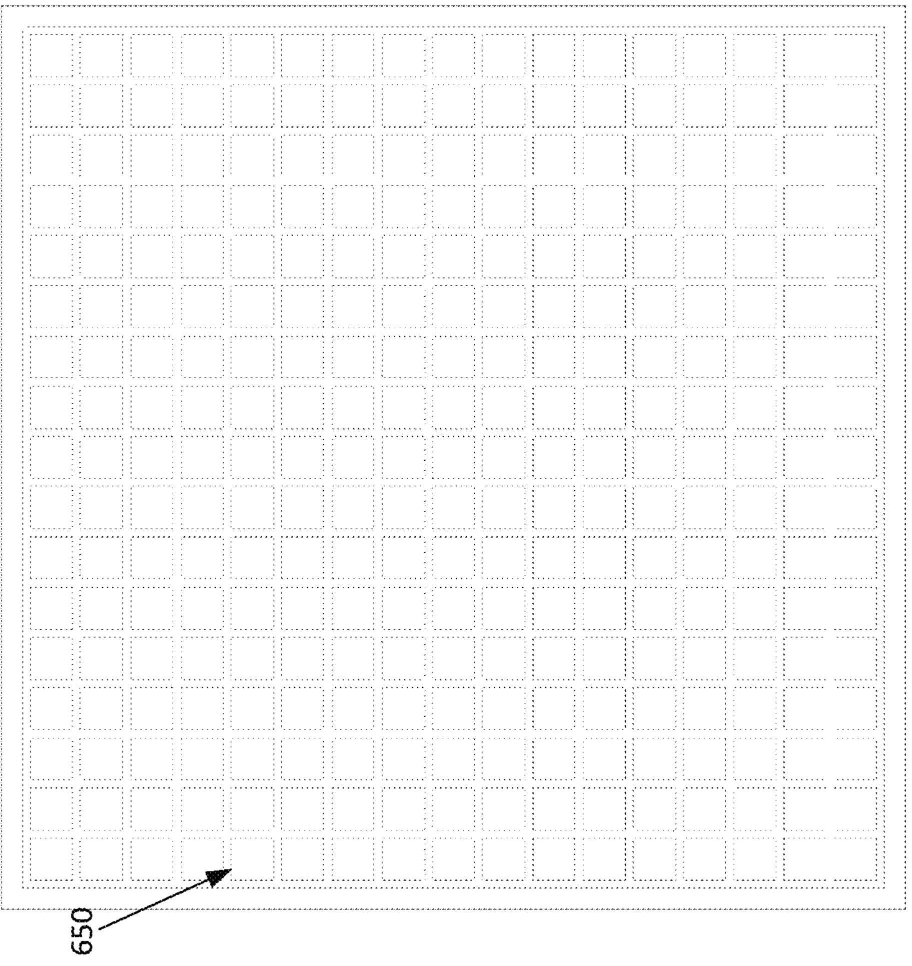
FIG. 5B is an illustration of a structural member, according to one embodiment of the present disclosure.
Figure 5B:
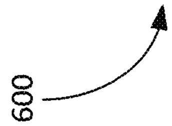
Figure 5B:
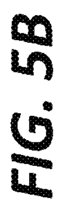

In one embodiment, the structural member can include or be a flat surface, e.g., a plate, of a first material. A flat surface of the structural member (e.g., a face of the plate) can include one or more grooves. In one example, the one or more grooves can form a lattice across the flat surface. FIG. 5A is an example of an aluminum plate 600. The aluminum plate 600 can include grooves formed in an XY lattice 650 across a top face of the plate 600. FIG. 5B is a top view of the face of the aluminum plate 600 having grooves formed in an XY lattice 650. In one embodiment, the perimeter of the face can be continuous.

Figure 5C:
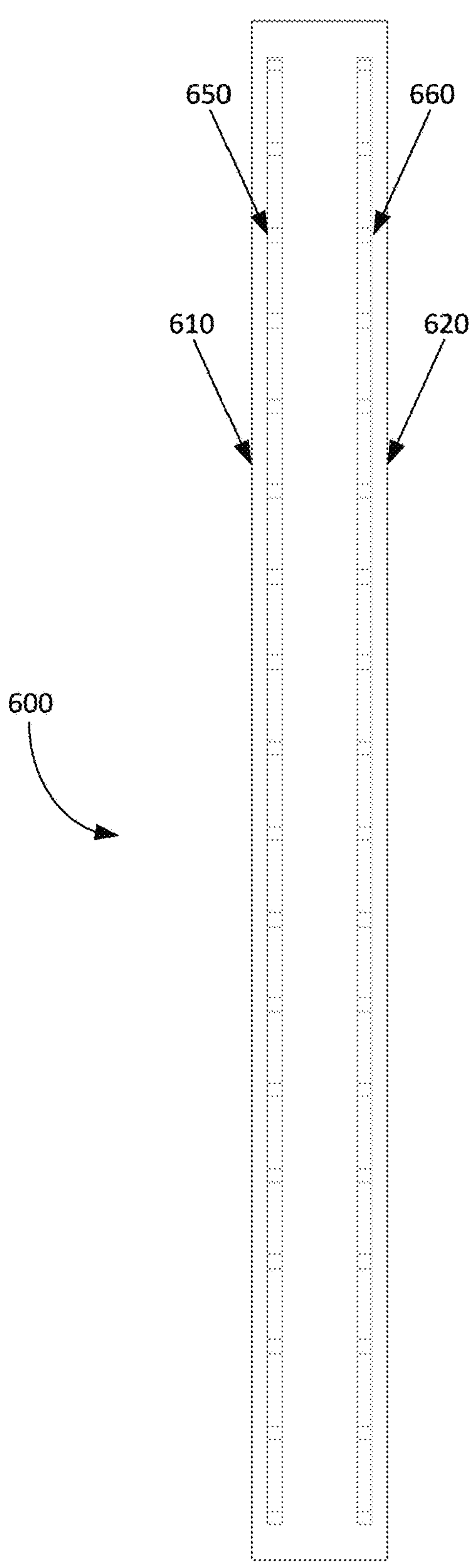
FIG. 5C is an illustration of a structural member, according to one embodiment of the present disclosure.
Figure 5D:
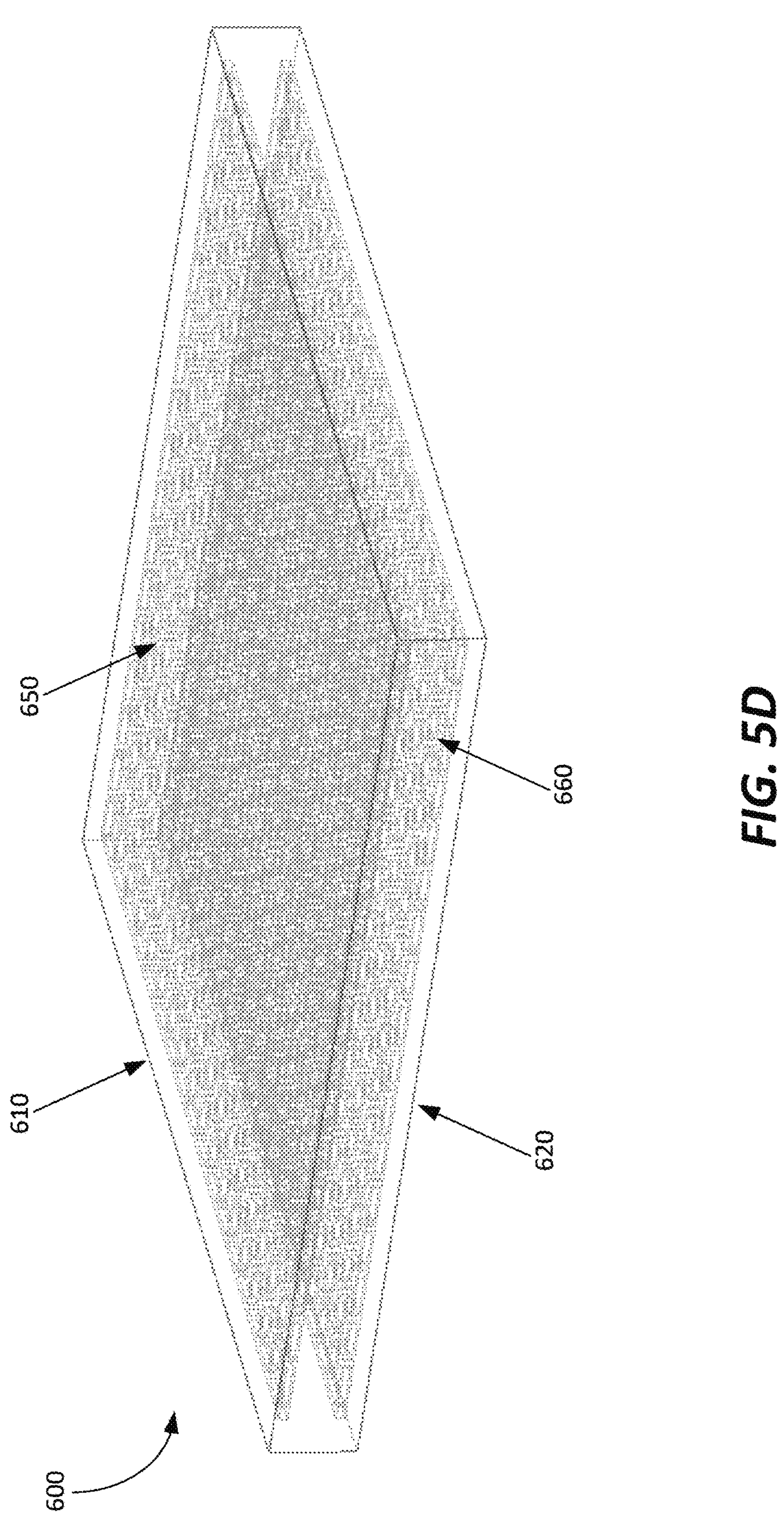
FIG. 5D is an illustration of a structural member, according to one embodiment of the present disclosure.

FIG. 5C is a side view of the aluminum plate 600. The top face 610 of the plate 600 can include grooves formed in the XY lattice 650. The opposing (bottom) face 620 of the plate 600 can also include grooves formed in a second XY lattice 660. In one embodiment, the top face 610 and the bottom face 620 can be identical. In one embodiment, only a single face of the aluminum plate 600 can include grooves. FIG. 5D is a transparent view of the aluminum plate 600. The top face 610 of the plate 600 can include grooves formed in the XY lattice 650. The opposing (bottom) face 620 of the plate 600 can also include grooves formed in a second XY lattice 660. In one embodiment, the depth of the grooves can be less than a depth of the aluminum plate 600.

In one embodiment, reinforcement components of a second material can be fitted into the lattices 650, 660. For example, a reinforcement component can be a lattice (e.g., a mesh, grating) of stainless steel. The reinforcement lattice can have dimensions (length, width, grid size, thickness) that correspond to the dimensions of the lattices 650, 660. In one embodiment, the reinforcement lattice can be composed of individual or merged stainless steel rods. In one embodiment, the reinforcement lattice can be provided in the grooves of the structural member and can be melded to the structural member. For example, the reinforcement lattice can be embedded in the face of the aluminum plate via solid-state welding. In one embodiment, a cap of the first material can cover the grooves in the face of the plate. The cap can be, for example, an aluminum sheet. The aluminum sheet can be welded to the face of the plate and/or the reinforcement lattice after the reinforcement lattice has been provided in the grooves. The welding of the sheet to the aluminum plate can secure the reinforcement lattice in the grooves.

It can be appreciated that the lattice structure of grooves in the aluminum plate 600 is a non-limiting embodiment of a geometry of grooves and reinforcement components. In one example, the grooves can be formed in non-intersecting rows along the face of the aluminum plate. In one example, the grooves can be diagonal, e.g., not parallel to x and y axes of the face of the aluminum plate. In one example, grooves can run from a first side of the surface to a second side. The first and second sides can be opposing or may not be opposing. In one embodiment, grooves can be contained within a border formed by the perimeter of the face, as illustrated in FIG. 5A.

Figure 6:
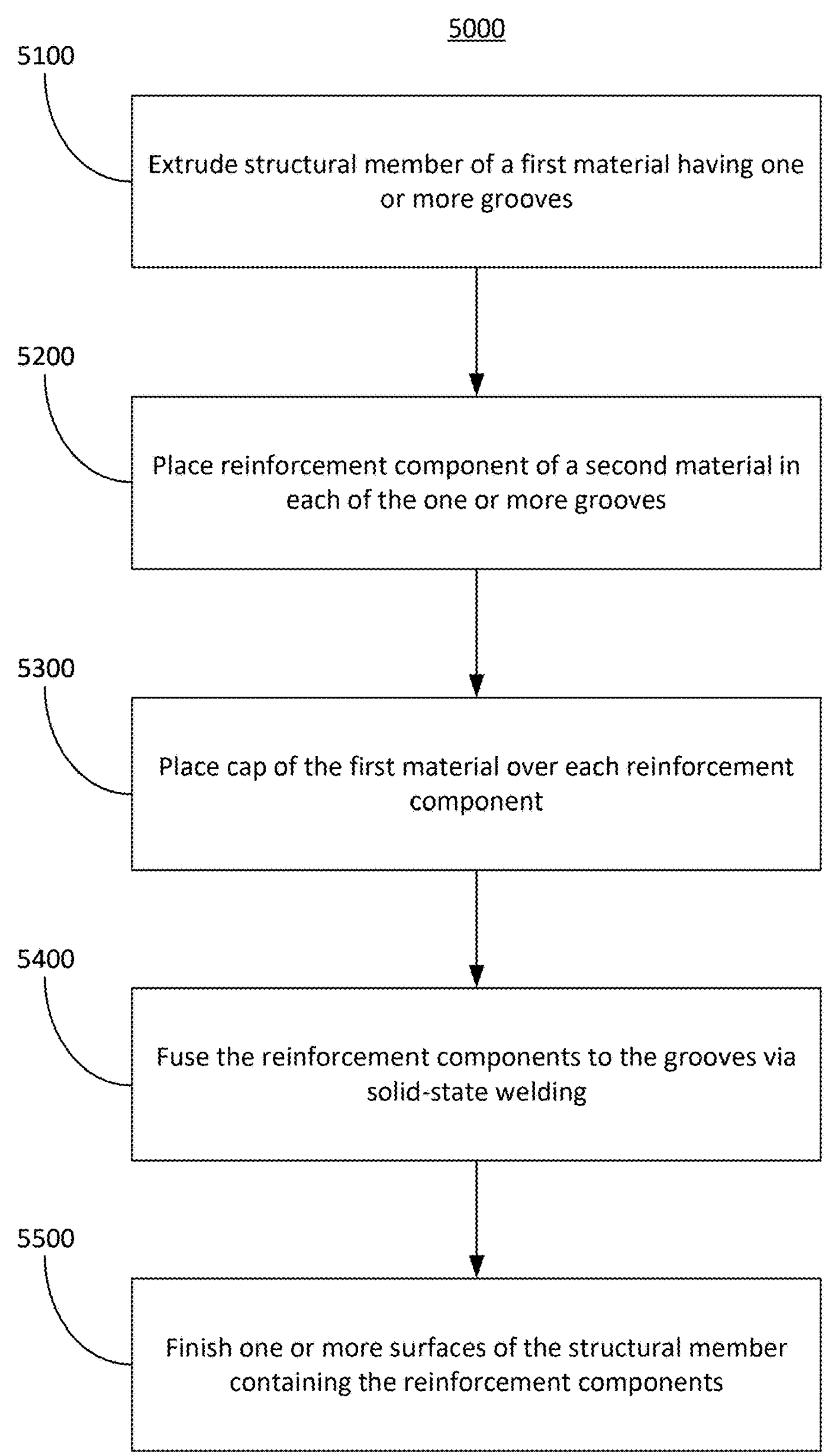
FIG. 6 is a method of reinforcing a structural member, according to one embodiment of the present disclosure.

FIG. 6 is a flow chart of a method 5000 for reinforcing a structural member of a first material according to one embodiment of the present disclosure. In step 5100, the structural member can be formed. The structural member can be formed with one or more grooves along a surface of the structural member. In one embodiment, the structural member can be an I-beam and can be formed via extrusion of the first material through a die. The I-beam can be extruded having one or more grooves (e.g., cylindrical grooves) extending lengthwise across a flange face.

In step 5200, one or more reinforcements of a second metal can be formed and placed or embedded in a corresponding groove. The one or more reinforcements can be formed to fit inside each of the one or more grooves of the I-beam. For example, the reinforcement can be a cylindrical rod of approximately the same length and radius as the groove. The reinforcement can be formed from a second material, the second material being stronger than the first material. For example, the first material of the structural member can be aluminum, and the second material of the reinforcement can be steel, hardened steel, etc.

In step 5300, a cap of the first material can be placed over each reinforcement component in a groove. The cap can be an elongated bar or rod of approximately the same length of the groove and can fit inside or over the groove. In one example, the cap can fill the remaining volume of the grove after the reinforcement is placed in the groove.

In step 5400, the reinforcements can be fused to the structural member. In one embodiment, the grooves can be welded to so that the reinforcements are fused to the grooves and embedded within the grooves. In one embodiment, the surface of the structural member having the grooves can be welded so that the reinforcements are fused to the grooves and embedded in the grooves. For example, the caps placed over the reinforcements in step 5300 can be welded to the reinforcements. In one embodiment, the welding can be a solid-state welding process, such as friction stir welding. In one embodiment, one or more surfaces of the structural member that are not being welded can be supported during the welding process. For example, the surface of the structural member that is being friction welded can be a face of a flange. A supporting force or pressure can be applied to the overhanging surfaces at the base of the flange to hold the structural member in place so that the softened reinforcements can be fused to the softened grooves.

In step 5500, one or more surfaces of the structural member having the grooves can be finished using a machine finishing process.

Figure 7A:
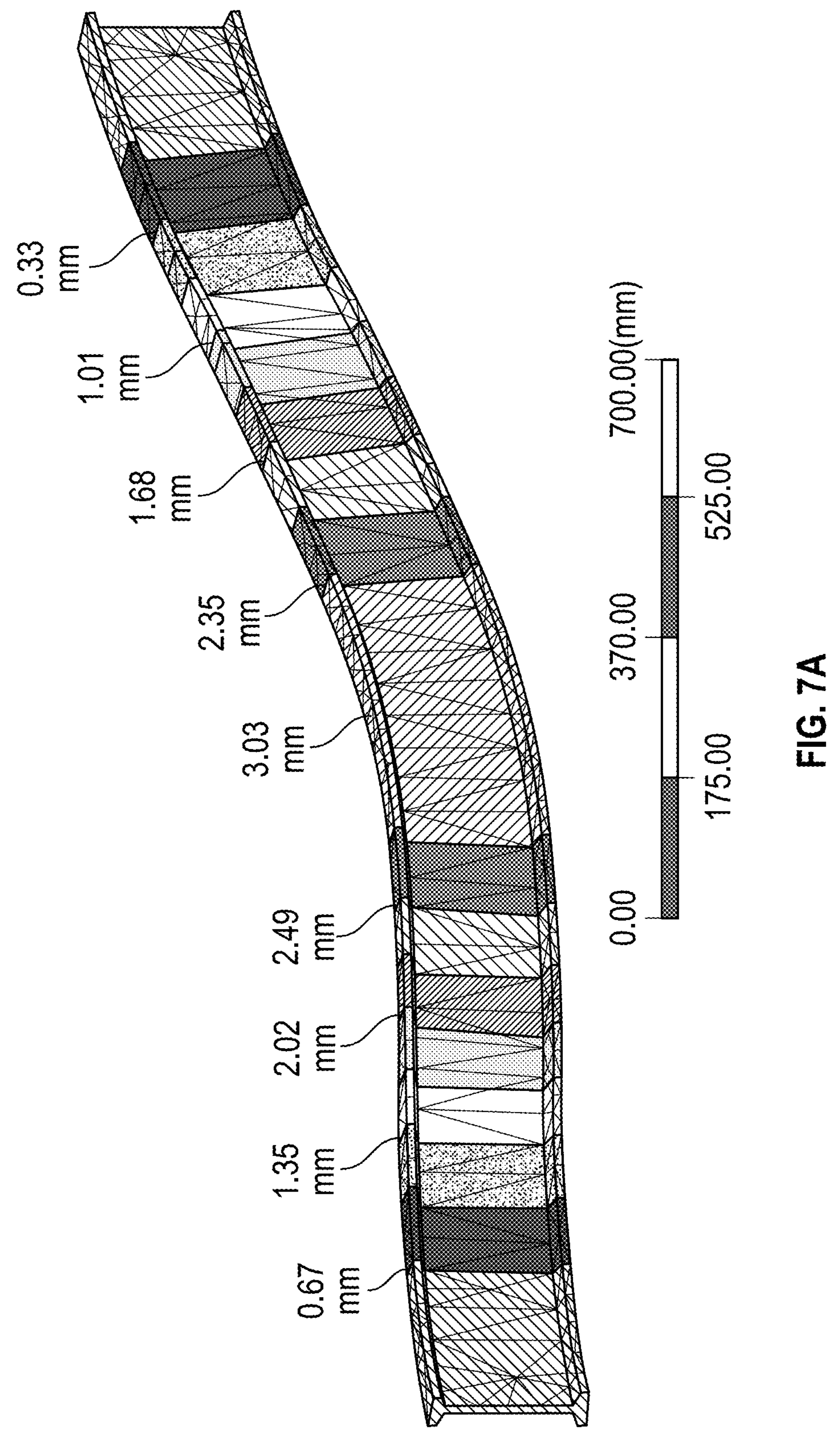
FIG. 7A is a simulation result of a structural member, according to one embodiment of the present disclosure.
Figure 7B:
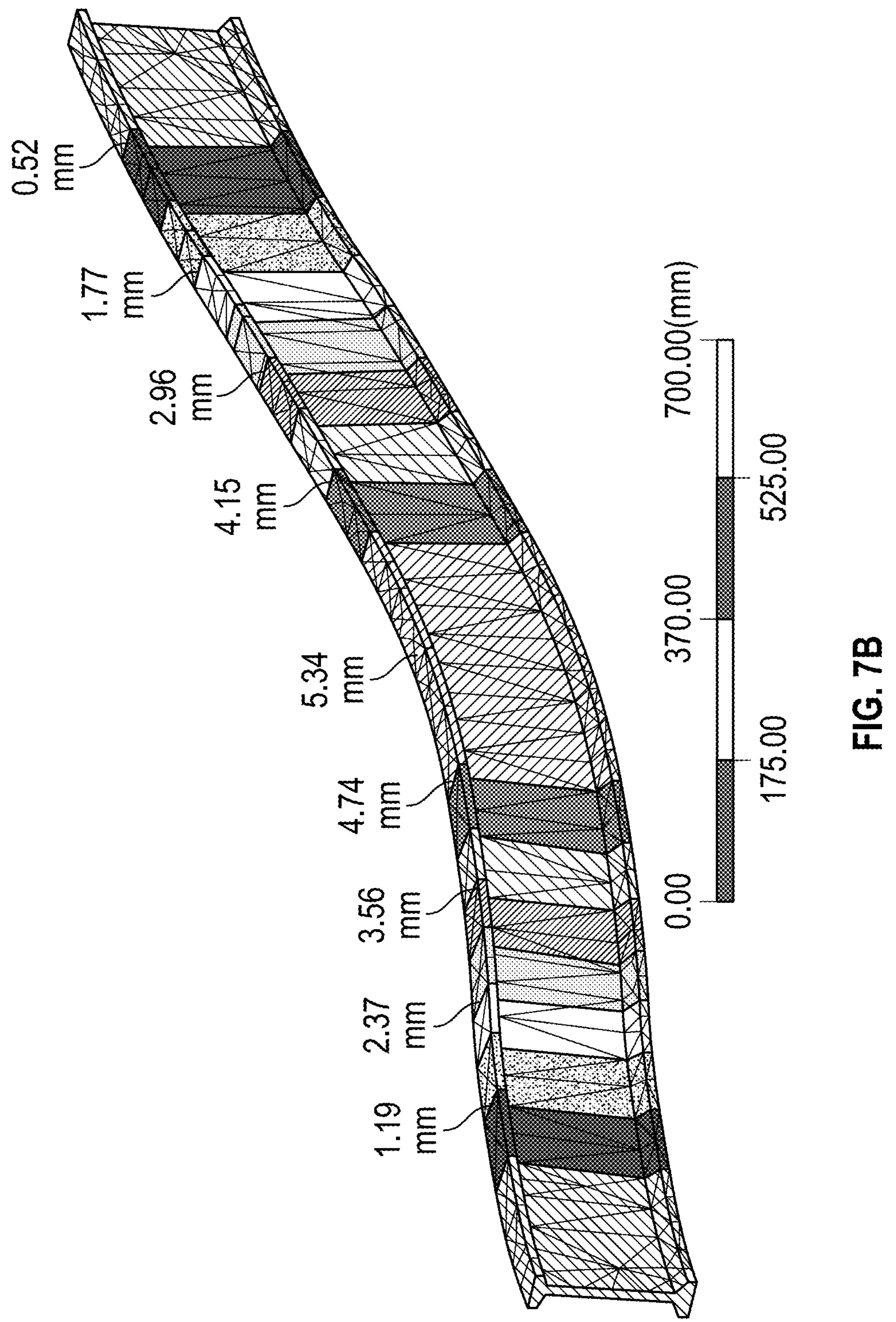
FIG. 7B is a simulation result of a reinforced structural member, according to one embodiment of the present disclosure.

FIG. 7A shows a simulation of beam deformation for an aluminum I-beam that has not been reinforced. The maximum deformation of the beam is approximately 3.02 mm at the center of the beam. The deformation of the beam illustrated in FIG. 7A can occur under 23,700 N of force. Given a safety factor of 3, the maximum load that the beam can bear is approximately 23,700 N. FIG. 7B shows a simulation of beam deformation for an aluminum I-beam that has been reinforced as described herein. In one example, the I-beam of FIG. 7B can be reinforced with ½ hard 304 stainless steel rods. The maximum deformation of the reinforced beam is approximately 5.34 mm. The deformation of the reinforced beam illustrated in FIG. 7B can occur under 50,000 N of force. Given a safety factor of 3, the maximum load that the reinforced beam can bear is approximately 50,000 N. The reinforced beam of FIG. 7B is stronger and more ductile than the beam of FIG. 7A.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

Obviously, numerous modifications and variations of the present invention are possible in light of the above teachings. Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. It is therefore to be understood that within the scope of the appended claims, the methods of the disclosure may be practiced otherwise than as specifically described herein.

The invention claimed is:

1. A method for reinforcing structural members, comprising:

forming a structure of a first metal, the structure including at least one groove along a surface of the structure;

placing a rod of a second metal in the at least one groove along the surface of the structure such that an entirety of the rod lies within the groove below the surface of the structure when placed into the at least one groove;

providing a cap of the first metal over the rod in the at least one groove along the surface of the structure; and embedding the rod in the structure by solid-state welding the structure, rod and cap together, wherein the rod remains intact and embedded in the structure as a reinforcing element after the solid-state welding, and wherein the structure is an I-beam and the surface of the structure is a surface of a flange of the I-beam.

2. The method of claim 1, wherein the first metal is aluminum and the second metal is steel.

3. The method of claim 1, further comprising supporting the I-beam at a side of the flange which is opposite to the surface of the flange during the solid state welding.

4. The method of claim 1, wherein the forming the I-beam includes extruding the I-beam having the at least one groove along the surface of the I-beam.

5. The method of claim 1, wherein the rod includes one or more raised features along a surface of the rod.

6. The method of claim 1, wherein the solid-state welding is friction stir welding.

7. The method of claim 1, wherein the cap includes an elongated bar of the first metal dimensioned to at least partially fill a remaining volume of the groove over the rod, such that an exterior surface of the cap forms at least a portion of the face of the structure after the embedding.

* * * * *